United States Patent
Basa-Martinez

(10) Patent No.: US 10,776,061 B2
(45) Date of Patent: Sep. 15, 2020

(54) ELECTRONIC DEVICE AND IMAGE FORMING APPARATUS EQUIPPED WITH DOCUMENT BOX FUNCTION

(71) Applicant: KYOCERA Document Solutions Inc., Osaka (JP)

(72) Inventor: Diana Denise Basa-Martinez, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/531,547

(22) Filed: Aug. 5, 2019

(65) Prior Publication Data

US 2020/0073609 A1 Mar. 5, 2020

(30) Foreign Application Priority Data

Sep. 5, 2018 (JP) .................................. 2018-166375

(51) Int. Cl.
*G06F 3/12* (2006.01)
*G06F 3/02* (2006.01)

(52) U.S. Cl.
CPC .............. *G06F 3/1279* (2013.01); *G06F 3/02* (2013.01)

(58) Field of Classification Search
CPC ..................................................... G06F 3/1279
USPC ................................................. 358/1.15, 1.16
See application file for complete search history.

(56) References Cited

U.S. PATENT DOCUMENTS

| 7,379,930 | B2 * | 5/2008 | Kasatani | ............. H04N 1/32128 |
| | | | | 707/770 |
| 2007/0199055 | A1 * | 8/2007 | Hashimoto | ......... G06F 21/6209 |
| | | | | 726/5 |
| 2008/0212131 | A1 * | 9/2008 | Osada | .................... G06F 3/1207 |
| | | | | 358/1.15 |
| 2010/0177346 | A1 * | 7/2010 | Mita | ..................... G06F 3/1215 |
| | | | | 358/1.15 |

FOREIGN PATENT DOCUMENTS

JP 2008-085402 A 4/2008

* cited by examiner

*Primary Examiner* — Jacky X Zheng
(74) *Attorney, Agent, or Firm* — IP Business Solutions, LLC

(57) ABSTRACT

An electronic device includes a storage device, an entry operation unit, and a control unit. The storage device stores a document box in which document data is accumulated and stored. The entry operation unit accepts entry of a box name of the document box. The control unit includes a processor and, when the processor executes a control program, functions as a deletion controller. The deletion controller stores a predetermined plurality of keywords each indicating a saving period of the document data, and deletes the document data stored in the document box including at least one of the plurality of keywords in the box name thereof, the delete being performed in accordance with the saving period indicated by the included keyword.

5 Claims, 5 Drawing Sheets

Fig.2

| CREATING A BOX | | |
|---|---|---|
| BOX NO:<br>AUTO | [CHANGE >] | |
| BOX NAME: | [CHANGE >] | |
| | 91 | |
| OWNER:<br>1 | | [CHANGE >] |
| USAGE RESTRICTION:<br>200MB | | [CHANGE >] |
| PERMISSION:<br>PERMIT | | [CHANGE >] |
| OVERWRITE SETTING:<br>PERMIT | | [CHANGE >] |
| DELETE AFTER PRINTED:<br>OFF | | [CHANGE >] |
| FREE SPACE:<br>200.0MB | [CANCEL] | [SAVE] |

| BOX NAME |
| USE THE KEYBOARD TO ENTER. |

SAMPLE_3H

LIMIT : 32 CHARACTERS
INPUT : 13 CHARACTERS

910

| 1 | 2 | 3 | 4 | 5 | 6 | 7 | 8 | 9 | 0 | - | = | ¥ | BACKSPACE |
| q | w | e | r | t | y | u | i | o | p | [ | ] |
| a | s | d | f | g | h | j | k | l | ; | ' |
| z | x | c | v | b | n | m | , | . | / | @ | - |

↑ ↓ ← →

SAVE

CANCEL

1

ELECTRONIC DEVICE AND IMAGE FORMING APPARATUS EQUIPPED WITH DOCUMENT BOX FUNCTION

INCORPORATION BY REFERENCE

This application claims priority to Japanese Patent Application No. 2018-166375 filed on Sep. 5, 2018, the entire contents of which are incorporated by reference herein.

BACKGROUND

The present disclosure relates to an electronic device and an image forming apparatus that are equipped with a document box function.

In some electronic devices such as image forming apparatuses, there are ones equipped with document box functions by which pieces of document data obtained by reading originals and pieces of document data received from external devices through networks are accumulated and stored. There are known techniques in which saving periods of pieces of document data within the document boxes are set and upon passing of the saving periods, delete the pieces of document data.

SUMMARY

A technique improved over the aforementioned technique is proposed as one aspect of the present disclosure.

An electronic device according to one aspect of the present disclosure includes a storage device, an entry operation unit, and a control unit. The storage device stores a document box in which document data is accumulated and stored. The entry operation unit accepts entry of a box name of the document box. The control unit includes a processor and, when the processor executing a control program, functions as a deletion controller. The deletion controller stores a predetermined plurality of keywords each indicating a saving period of the document data, and deletes the document data stored in the document box including at least one of the plurality of keywords in the box name thereof, the delete being performed in accordance with the saving period indicated by the keyword included.

An image forming apparatus of the present disclosure includes the above-described electronic device and an image forming unit that forms an image on a recording medium.

BRIEF DESCRIPTION OF THE DRAWINGS

FIG. 2 shows a screen example displayed on a display.

FIG. 3 shows another screen example displayed on the display.

DETAILED DESCRIPTION

Hereinafter, a description will be given, with reference to the drawings, of an image forming apparatus as one embodiment of an electronic device according to the present disclosure.

Figure 1:
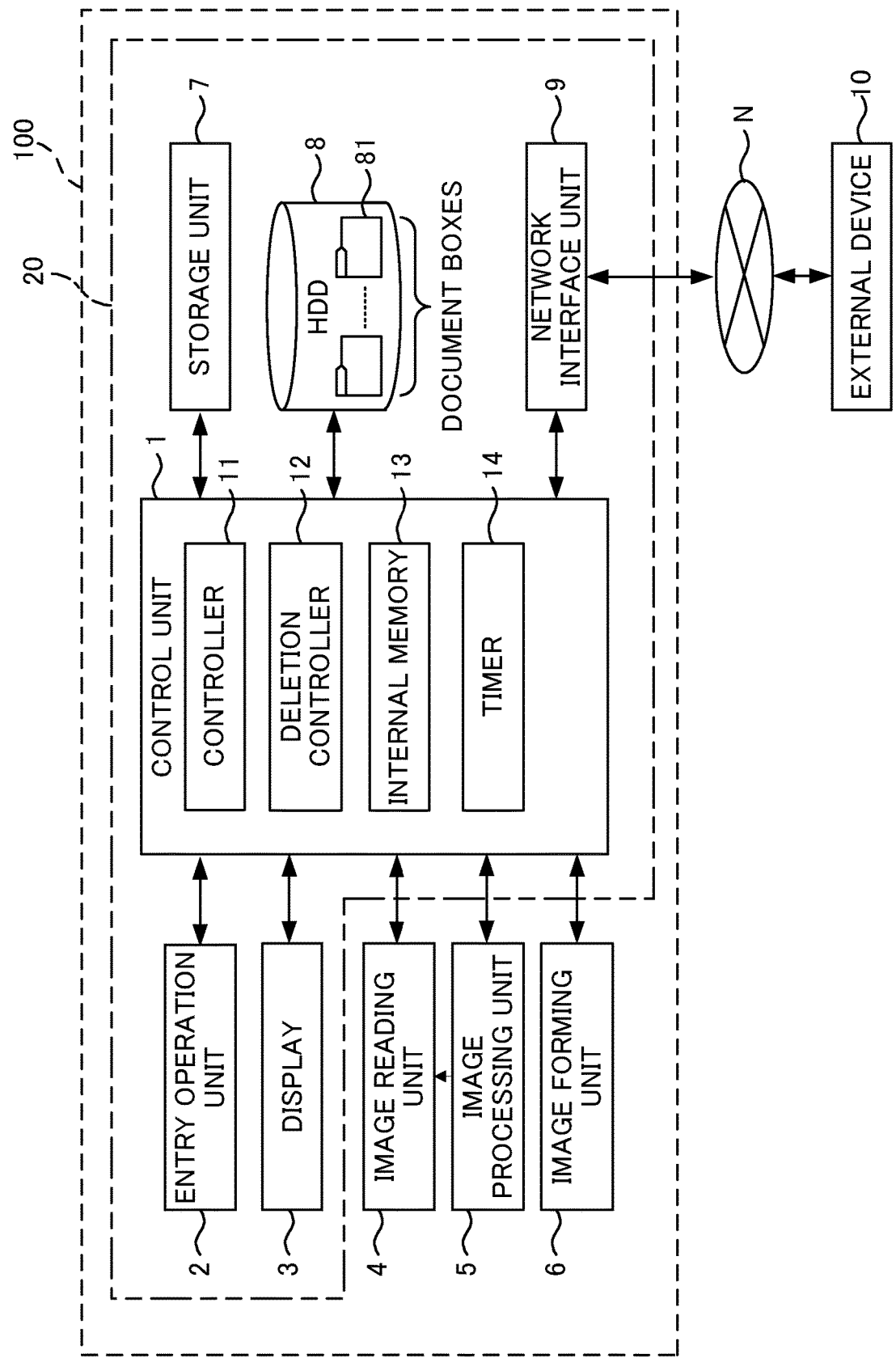
FIG. 1 is a block diagram showing an internal configuration of an image forming apparatus.

FIG. 1 is a block diagram showing an internal configuration of an image forming apparatus 100 according to an embodiment of the present disclosure. The image forming apparatus 100 of the present embodiment will be described by taking, as an example, a copy machine that reads an image of an original and prints the image on a sheet of paper. The image forming apparatus 100 may also be another apparatus so long as the apparatus has the image reading function (for example, a composite machine having multiple functions including a facsimile function, a scan function, and a copy function).

The image forming apparatus 100 includes, for example, a control unit 1, an entry operation unit 2, a display 3, an image reading unit 4, an image processing unit 5, an image forming unit 6, a storage unit 7, a hard disc drive (hereinafter referred to as "HDD") 8, and a network interface unit 9. An electronic device 20 can be described as having configuration excluding the image reading unit 4, the image processing unit 5, and the image forming unit 6 from the image forming apparatus 100, as shown in FIG. 1.

The entry operation unit 2 has hard buttons such as a menu button for calling a menu and a start and stop button by which execution of operation is instructed, and the entry operation unit 2 accepts an operation instruction from a use.

The display 3 is a display device formed of a liquid crystal display (LCD), an organic electro-luminescence (OLED: Organic Light-Emitting Diode) display or the like, and an integrated type with, for example, a touch panel. The touch panel is of, for example, a so-called resistive film type or electrostatic capacitance type, and acts also as the entry operation unit 2. The touch panel detects a user's touch, for example by a finger, together with its touched position.

The image reading unit 4 reads the original and obtains an image thereof. The image processing unit 5 performs image processing on the image read by the image reading unit 4: the image processing includes rotation processing, enlargement/reduction processing, and density change. The image forming unit 6 prints, on a sheet of paper, images such as the image read by the image reading unit 4, the image transmitted from an external device, and the image to which the image processing unit 5 has performed the image processing.

The HDD 8 (one example of the storage device recited in WHAT IS CLAIMED IS) stores programs and data needed for operations of the image forming apparatus 100. A document box 81, other document data, and image data are accumulated and stored in the HDD 8. The document box 81 includes folders.

The network interface unit 9 is formed of a communication module such as a LAN board, and transmits and receives various data with and from, for example, an external device 10 that is on a network N and is connected to the network interface unit 9.

The control unit 1 includes, for example, a processor, a random access memory (RAM), and a read only memory (ROM). Examples of the processor include a central processing unit (CPU), a micro processing unit (MPU), and an application specific integrated circuit (ASIC). The control unit 1 functions as a controller 11 and a deletion controller 12 when a control program stored in the ROM or the HDD 8 is executed by the processor. The controller 11 and the deletion controller 12, however, may each be configured by a hardware circuit, instead of acting in accordance with the control program.

The controller 11 governs overall operation control of the image forming apparatus 100. The control unit 1 includes an internal memory 13 and a timer 14. For the document box 81 including at least one keyword indicating a saving period in its box name, the deletion controller 12 deletes the document data stored in the document box 81 at the timing according to the keyword. The deletion controller 12 stores a predetermined plurality of keywords each indicating the saving period of the document data. For example, the deletion controller 12 stores the plurality of keywords in the internal memory 13. When at least one of the keywords is included in the box name (i.e., when the box name contains at least one of the keywords), the deletion controller 12 deletes the document data stored in the document box having the box name including the keyword in accordance with the saving period indicated by the keyword.

Each of the plurality of keywords respectively indicates minutes, hours, months and years, and indicates the saving period of the document data by being combined with a number included in the box name together with the respective keywords.

FIG. 2 shows a screen example 900 displayed on the display 3. The screen example 900 is a screen for creating the document box 81. FIG. 3 shows a screen example 910 also displayed on the display 3. The screen example 910 is a screen for changing the box name of the document box 81.

It is desirable for the document data within the document box 81 to be deleted at regular intervals to prevent information leakage and to obtain an empty capacity in the HDD 8. However, it takes time and effort for a user to select and delete the data. There are, depending on functions, image forming apparatuses that can set deletion timing of document data at setting screens of document boxes. However, even in that case, the user has to perform operation of displaying the setting screen on the display and then setting the timing of deletion, so that time and effort are still required.

In the image forming apparatus 100 according to the present embodiment, when a user includes the keyword indicating the storage period in the box name in creating the document box 81, the deletion controller 12 deletes the document data within that document box 81 at the timing according to the keyword. The user can set a time limit of the storage period at simultaneously with entering the box name of the document box 81, so that the timing of deletion of the document data can be easily set.

The user firstly operates the entry operation unit 2 and enters an instruction to display, on the display 3, the screen example 900 that is for creating the document box 81. The controller 11 follows the instruction and causes the display 3 to display the screen example 900. While the display example 900 is being displayed, when the user selects (touches) a button 91 that is for setting the box name, the instruction of displaying the screen example 910 on the display 3 is received through the touch panel. The controller 11 causes the display 3 to display the screen example 910 in response to the instruction.

Using a keyboard displayed on the screen example 910, the user enters the box name of the document box 81. The user enters a main portion of the box name (for example, "sample") at first. Next, the user enters a predetermined symbol (such as an underscore) after the main portion of the box name, then enters the keyword indicating the storage period after the symbol. The main portion of the box name, the predetermined symbol, and the keyword are received through the touch panel.

Examples of the keywords are "h", "m", "d", and "u" entered in single-byte alphabet characters: "h" represents hours, "m" represents minutes, "d" represents date, and "u" represents a specified time limit. The storage period is indicated by combining these single-byte alphabet characters and single-byte numerals. The keywords and the meanings that the keywords indicates are set prior to the factory shipment of the image forming apparatus 100 and are stored in the internal memory 13 of the control unit 1. Followings are examples of the timing of deletion indicated by the keywords:

the document data in the box name "sample_2h" is deleted every two hours;

the document data in the box name "sample_10m" is deleted every ten minutes;

the document data in the box name "sample_1221d" is deleted on December 21st every year;

the document data in the box name "sample_1400u" is deleted at 2 p.m. every day; and the document data in the box name "sample_6h10m" is deleted every 6 hours and 10 minutes.

After the image forming apparatus 100 has installed, a user (such as an administrator of the image forming apparatus 100) can arbitrarily set a new keyword. For example, the user operates the entry operation unit 2 to set a keyword "Sun" and set the meaning thereof as "delete the document data on every Sunday". Then, when the user names the box name of the document box as "sample_Sun", the deletion controller 12 stores the settings having been entered and executes processing of deleting the document data stored in the document box every Sunday.

The deletion controller 12 stores, for example, into the internal memory 13 of the control unit 1, a box name list of document boxes including the keyword in the box name. In accordance with the saving period included in the box name stored in the internal memory 13, the deletion controller 12 deletes the document data within the applicable document box.

Figure 4:
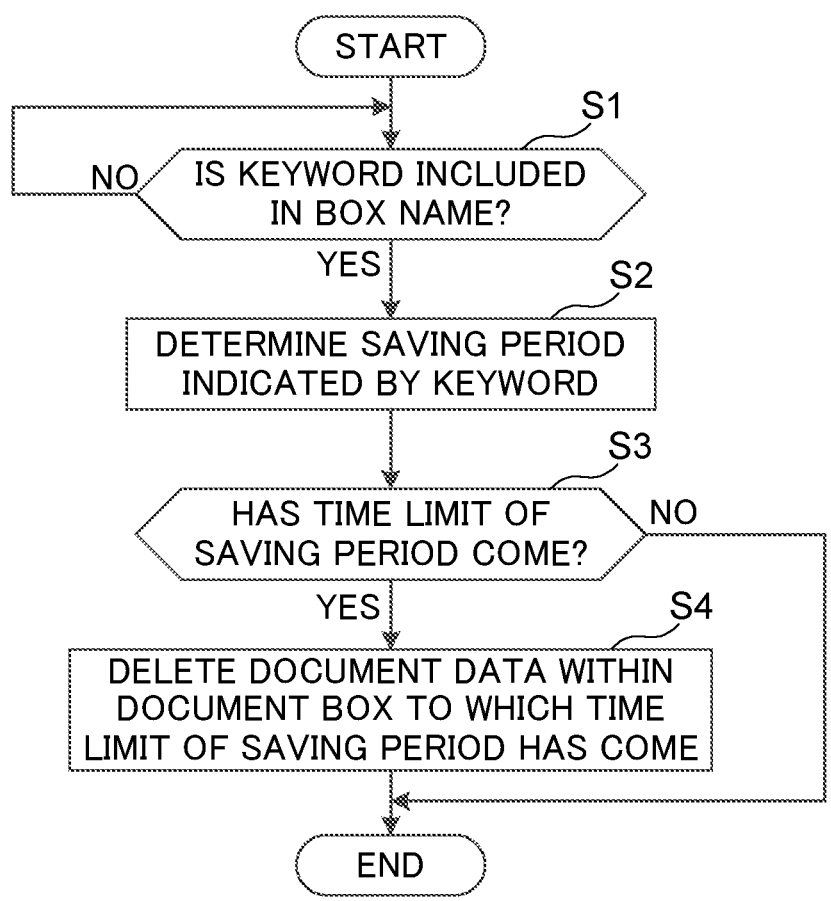
FIG. 4 is a flowchart showing a first embodiment of processing performed by the image forming apparatus in deleting document data within a document box.

Hereinafter describes the first embodiment of the processing performed by the image forming apparatus 100 in deleting document data within the document box. FIG. 4 is a flowchart showing the first embodiment of the processing performed by the image forming apparatus 100 in deleting document data within the document box. In creating the document box 81 in the HDD 8, a user operates the entry operation unit 2 to, as described above, include and set the aforesaid symbol and the keyword in the box name of the document box 81. The deletion controller 12 stores the date and time at which the document box 81 was given the box name and created.

When the image forming apparatus 100 is in the operation state, the deletion controller 12 detects if the user has included the symbol and the keyword in each box name of each document box 81 stored in the HDD 8 (S1).

In detecting that the symbol and the keyword are included in the box name of the document box 81 (YES in S1), the deletion controller 12 determines the saving period indicated by the keyword included in the box name (S2).

Then, on the basis of the date and the time being measured by the timer 14, the deletion controller 12, for example, determines whether the time limit indicated by the determined saving period has come (S3). For example, when the box name is "sample_2h", the deletion controller 12 determines if the elapsed time has reached two hours from the date and time at which the document box 81 having that box name was created. Furthermore, when the box name is "sample_1400u", the deletion controller 12 determines if the time at this point is 2 p.m. Still further, when the box name is "sample_1221d", the deletion controller 12 determines if the date at this point is December 21.

In determining that the time limit indicated by the determined saving period has come (YES in S3), the deletion controller 12 deletes all pieces of document data stored in the document box 81 having the box name including the keyword (S4). As for document box 81 to which the deletion controller 12 has determined that the time limit indicated by the determined saving period has yet to come (NO in S3), the deletion controller 12 performs no deletion on the document data stored in that document box.

The deletion controller 12 deletes none of the pieces of document data stored in the document box 81 to which the deletion controller 12 has determined, at step S1, as not including the symbol and the keyword in the box name. The processing temporality ends thereafter, and while the image forming apparatus 100 is in the operation state, the processing starts from S1 is repeated.

As described thus far, by setting, together with the box name of the document box, the saving period of the document data by way of combining the single-byte alphabet characters and single-byte numerals, the user can easily set the saving period of the document data within the document box.

In cases of known techniques referred to in BACKGROUND, in setting the saving period of the document data, a user has to go through trouble of opening the setting screen for the document box subjected and make entry. This takes much time and effort.

In contrast, the present embodiment can set the time limit of the storage period of the document data within the document box much easily.

According to the present embodiment, when the box name of the document box includes the keyword indicating the saving period of the document data within the document box, the document data is deleted in accordance with the saving period. Thereby, the user can easily set the timing of deletion of the document data and thus it is possible to prevent shortage of the empty capacity of a memory where the document box are stored and prevent information leakage caused by leaving document data for a long time.

In the present embodiment, the case has been described where the box name of the document box and the saving period are set by combining the single-byte alphabet characters and single-byte numerals. Alternatively, combination using double-byte characters may be used. Furthermore, descriptions were given to the case of using "h", "m", "d", and "u" as the keywords to indicate the saving period. However, other keywords may further be used.

As described above, by enabling the user to arbitrarily set the keyword and the saving period indicated by the keyword, the present embodiment can improve convenience of the image forming apparatus 100.

Figure 5:
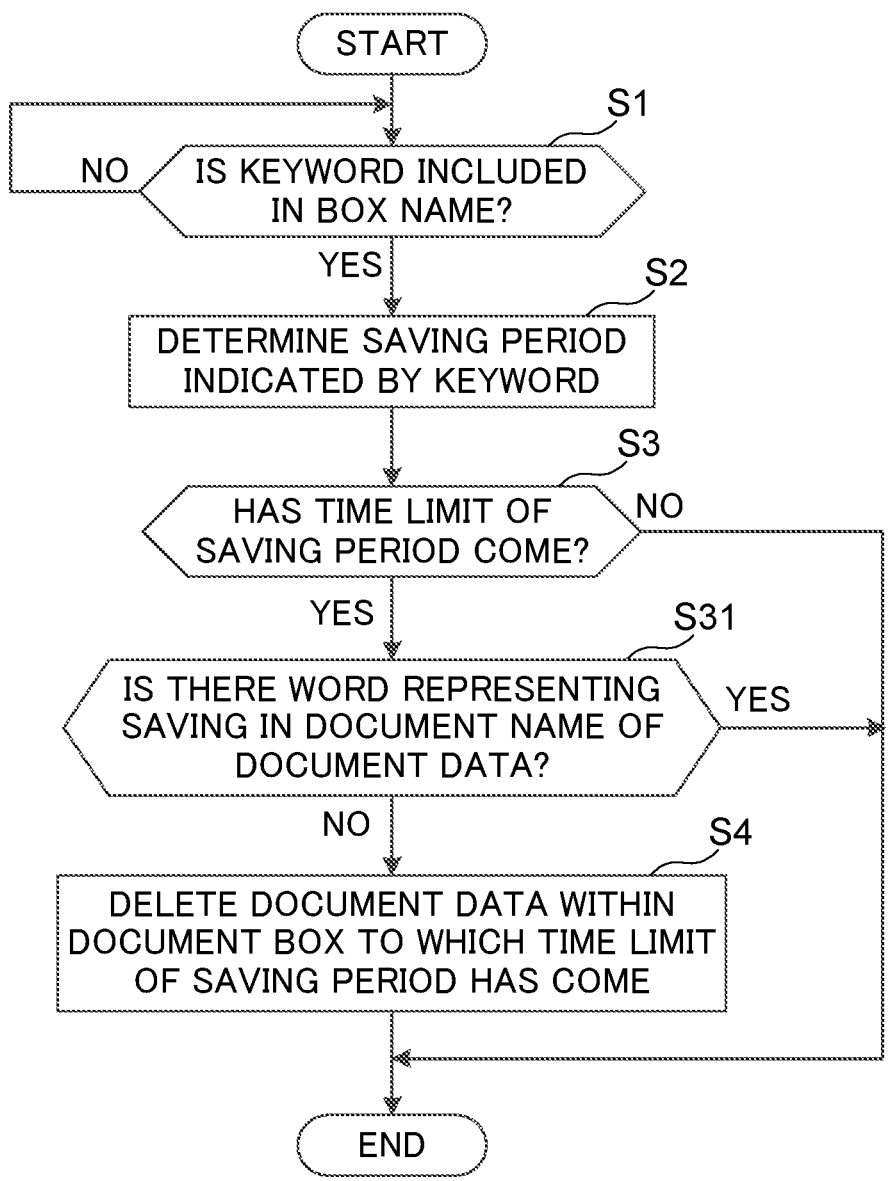
FIG. 5 is a flowchart showing a second embodiment of processing performed by the image forming apparatus in deleting the document data within the document box.

Hereinafter describes the second embodiment of the processing performed by the image forming apparatus 100 in deleting document data within the document box. FIG. 5 is a flowchart showing the second embodiment of the processing performed by the image forming apparatus 100 in deleting document data within the document box. The same processing as the first embodiment will not be repeated.

In the second embodiment, when determining that the time limit indicated by the determined saving period has come (YES in S3), the deletion controller 12 determines whether a document name of each piece of the document data stored in the document box 81 contains a predetermined word representing saving (S31).

As for the document data including the word representing saving in the document name (YES in S31), even if the time limit indicated by the determined saving period has come, the deletion controller 12 does not delete the document data applicable. On the other hand, as for the document data not including the word representing saving in the document name (NO in S31), the deletion controller 12 deletes the document data applicable (S4).

Combination of symbols and characters, such as "_save_" is used as the predetermined word representing saving, for example.

When "YES" in step S31, the deletion controller 12 may be configured to: cause the display 3 to display a message for prompting the user to enter an instruction whether or not to continue saving the document data; perform no deletion on the document data when the instruction to continue saving the document data is entered; and delete the document data when the instruction to discontinue saving the document data is entered.

According to the second embodiment, by deciding whether or not to include the word representing saving in the document name of the document data stored within the document box 81, it is possible to adjust whether or not to delete the data when the time limit of the saving period comes.

The configurations and processing shown in the above embodiments with reference to FIGS. 1 to 5 are merely illustrative of the present disclosure and not intended to limit the present disclosure to the above particular configurations and processing.

While the present disclosure has been described in detail with reference to the embodiments thereof, it would be apparent to those skilled in the art the various changes and modifications may be made therein within the scope defined by the appended claims.

What is claimed is:

1. An electronic device comprising:
   a storage device storing a document box in which document data is accumulated and stored;
   an entry operation unit accepting entry of a box name of the document box; and
   a control unit including a processor and, when the processor executing a control program, functioning as a deletion controller,
   wherein the deletion controller stores a predetermined plurality of keywords each indicating a saving period of the document data, and deletes the document data stored in the document box including at least one of the plurality of keywords in the box name thereof, the delete being performed in accordance with the saving period indicated by the keyword included,
   the electronic device further comprises a display, and
   when a document name of the document data stored in the document box contains a predetermined word representing saving, the deletion controller causes the display to display a message for prompting a user to enter an instruction whether or not to continue saving the document data having the document name containing the word representing saving, and through operation on the entry operation unit by the user, when the instruction to continue saving the document data is entered, the deletion controller performs no deletion on the document data and when the instruction to discontinue saving the document data is entered, the deletion controller deletes the document data.

2. The electronic device according to claim 1,
   wherein each of the plurality of keywords respectively indicates minutes, hours, months and years, and indicates the saving period by being combined with a number set together with the respective keywords.

3. The electronic device according to claim 1, wherein
when the box name includes at least one of the plurality of keywords, the deletion controller determines whether a time elapsed from a day and time at which the document box including the box name was created has reached a time limit of the saving period, and
in determining that the time limit of the saving period has been reached, the deletion controller deletes the document box including the box name.

4. The electronic device according to claim 1, wherein
the entry operation unit further accepts new setting entry of the keyword, and
the deletion controller adds and stores a new keyword of the new setting entry accepted by the entry operation unit.

5. An image forming apparatus comprising:
the electronic device according to claim 1; and
an image forming unit forming an image on a recording medium.

* * * * *